US010387842B2

(12) United States Patent
Hirota et al.

(10) Patent No.: US 10,387,842 B2
(45) Date of Patent: Aug. 20, 2019

(54) SYSTEM, METHOD, AND PROGRAM FOR FILTERING EMAILS

(75) Inventors: Kenji Hirota, Kanagawa-ken (JP); Tomonori Sugiura, Kanagawa-ken (JP); Hidekuni Ueda, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 12/424,026

(22) Filed: Apr. 15, 2009

(65) Prior Publication Data

US 2009/0265441 A1    Oct. 22, 2009

(30) Foreign Application Priority Data

Apr. 18, 2008 (JP) ................................ 2008-108958

(51) Int. Cl.
*G06F 15/16* (2006.01)
*G06Q 10/10* (2012.01)

(52) U.S. Cl.
CPC ........... *G06Q 10/107* (2013.01); *G06Q 10/10* (2013.01)

(58) Field of Classification Search
CPC ............................ G06Q 10/107; G06Q 10/10
USPC .................................................. 709/206, 207
See application file for complete search history.

(56) References Cited

U.S. PATENT DOCUMENTS

| 2004/0186894 A1* | 9/2004 | Jhingan et al. ............... 709/207 |
| 2006/0026246 A1* | 2/2006 | Fukuhara et al. ............ 709/206 |

FOREIGN PATENT DOCUMENTS

| JP | 2004-227056 A | 8/2004 |
| JP | 2004-265025 A | 9/2004 |
| JP | 2005-268873 A | 9/2005 |
| JP | 2006-344000 A | 12/2006 |
| JP | 2007-079625 A | 3/2007 |
| JP | 2007-122125 A | 5/2007 |

* cited by examiner

*Primary Examiner* — Kyung H Shin
(74) *Attorney, Agent, or Firm* — Steven M. Greenberg, Esq.; Shutts & Bowen LLP (57) ABSTRACT

[Object] To inspect emails without having to restrict the use of an email encryption function or the attachment of a file for which a password has been set.
[Solving Means] An email client includes an operation reception unit 110 for receiving an operation performed by a user and a processing unit 130 for performing a process according to this operation on an email. The email client also includes a detection unit 121 for detecting that the operation reception unit 110 has received a specific operation and an inspection unit 123 for, if a specific operation is detected, inspecting the email and a file to be attached to the email before the processing unit 130 performs a process according to the specific operation. If a password has been set for the file to be attached to the email, a password acquisition unit 122 acquires the password. A confirmation unit 124 inquires of a user about whether the process according to the operation received by the operation reception unit 110 should be performed, according to an inspection result.

13 Claims, 6 Drawing Sheets

FIG. 6 though the email client is offline, the third party can inspect the email client is online, the email is not

SYSTEM, METHOD, AND PROGRAM FOR FILTERING EMAILS

CROSS-REFERENCE TO RELATED APPLICATIONS

This application claims priority under 35 U.S.C. 119(a) to Japanese Patent Application Serial Number 2008-108958, filed Apr. 18, 2008, entitled "SYSTEM, METHOD, AND PROGRAM FOR FILTERING EMAILS", the entirety of which is incorporated herein by reference.

TECHNICAL FIELD

The present invention relates to a system, a method, and a program for filtering emails or files (attached files) attached to emails.

In recent years, companies have introduced email filtering systems for purposes such as filtering of emails and prevention of leakage of confidential information. Among email filtering methods are a method (e.g., see Patent Document 1) including temporarily accumulating emails sent from client terminals in a server and collectively filtering the emails therein and a method (e.g., see Patent Document 2) in which each client terminal itself filters an email to be sent.

Patent Document 1 discloses a technology for, in a filtering server, determining whether each of emails sent from clients should be filtered and sorting out emails to be filtered thereby reducing the workload of email filtering imposed on a person in charge of email filtering.

Patent Document 2 discloses a technology for, in a terminal, acquiring an email, an instruction for transmission of which has been given, and checking whether there are any restricted words in the email. Also, according to the technology described in Patent Document 2, if any restricted word is detected in the body of the email, the terminal issues an alarm message to the user in order to check whether the user still intends to send the email.

[Patent Document 1] Japanese Unexamined Patent Application Publication No. 2002-290469

[Patent Document 2] Japanese Unexamined Patent Application Publication No. 2004-227056

DISCLOSURE OF THE INVENTION

Problems to be Solved by the Invention

As described above, there are already related-art examples that filter emails in a server or terminals. However, with regard to these related-art examples, if the body of an email or a file attached to the email is encrypted, for example, using S/MIME, the third party cannot inspect the body of the email or the contents of the attached file. Also, if a file for which a password has been set is attached to an email, the password must be obtained in order to view the attached file. Therefore, it is difficult for the third party to inspect the contents of the file. For these reasons, if a related-art email filtering system is introduced, the use of the encryption function using S/MINE or the like or the attachment of a file, for which a password has been set, to an email must be restricted.

Also, if an email client is offline when a user attempts to send an email, the email client generally puts a sending process on hold. Subsequently, when the email client becomes online, it sends the reserved email. In this case, the email is inspected only when the email client becomes online and thus the email is actually sent. Therefore, a time difference is made between the time when the user has issues an instruction for transmission and the time when the email is inspected. This prevents the user from causing the email client to inspect the email or attached file immediately after the user has issued the transmission instruction and then modifying the email or attached file on the basis of a result of the inspection.

Accordingly, an object of the present invention is to provide a system and the like that prevent leakage of confidential information without having to restrict the use of an email encryption function or the attachment of a file for which a password has been set.

Means for Solving the Problems

With the above-described object, the present invention is realized as a system described below. That is, the system includes an operation reception unit for receiving an operation performed by a user with respect to an email; a processing unit for performing, on the email, a process according to the operation received by the operation reception unit; a detection unit for detecting that the operation reception unit has received a specific operation; and an inspection unit for, if the detection unit detects the specific operation, inspecting the email and a file to be attached to the email before the processing unit performs a process. More preferably, if the detection unit detects an operation for attaching the file to the email, the inspection unit inspects the email and the file.

The above-described system may further include a password acquisition unit for checking whether a password has been set for the file and, if a password has been set, acquiring the set password. In this case, the inspection unit may authenticate the file using the password acquired by the password acquisition unit so as to inspect the file. Also, the password acquisition unit may convey, to a user, a message urging the user to input the set password and then receives the set password inputted by the user, so as to acquire the desired password. Or the password acquisition unit may acquire the set password by reading the set password from a password management file in which passwords that may be used are collected.

The above-described system may further include a confirmation unit for conveying, to a user, a message for inquiring about whether the process according to the operation received by the operation reception unit should be performed, on the basis of a result of the inspection performed by the inspection unit. In this case, if the confirmation unit has not conveyed the message or if an instruction for performance of the process is inputted, the processing unit may perform the process. If the instruction for performance of the process is inputted, the processing unit may change the destination of the email to the address of a user who has the authority to approve transmission of the email or may add such an address as a destination of the email.

The present invention may be realized as a method described below. That is, the method includes the steps of: receiving an operation performed by a user with respect to an email and detecting that a specific operation has been received; if the specific operation is detected, inspecting the email and a file to be attached to the email; and after the inspection is performed, performing a process according to the received operation on the email.

Further, the present invention may be realized as a program for realizing the functions of the above-described system by controlling a computer, or a program for causing a computer to perform processes corresponding to the steps of the above-described method. Such a program is provided, for example, by recording the program in an optical disk, a magnetic disk, a semiconductor memory, or other recording media and then distributing the program, or by distributing the program via a network.

Advantages

According to the present invention, an email and a file to be attached to the email are inspected before a process such as encryption or file attachment is performed. This prevents leakage of confidential information without having to restrict the use of an email encryption function or the attachment of a file for which a password has been set.

BEST MODE FOR CARRYING OUT THE INVENTION

An embodiment of the present invention will now be described in detail with reference to the accompanying drawings.

System Configuration

Figure 1:
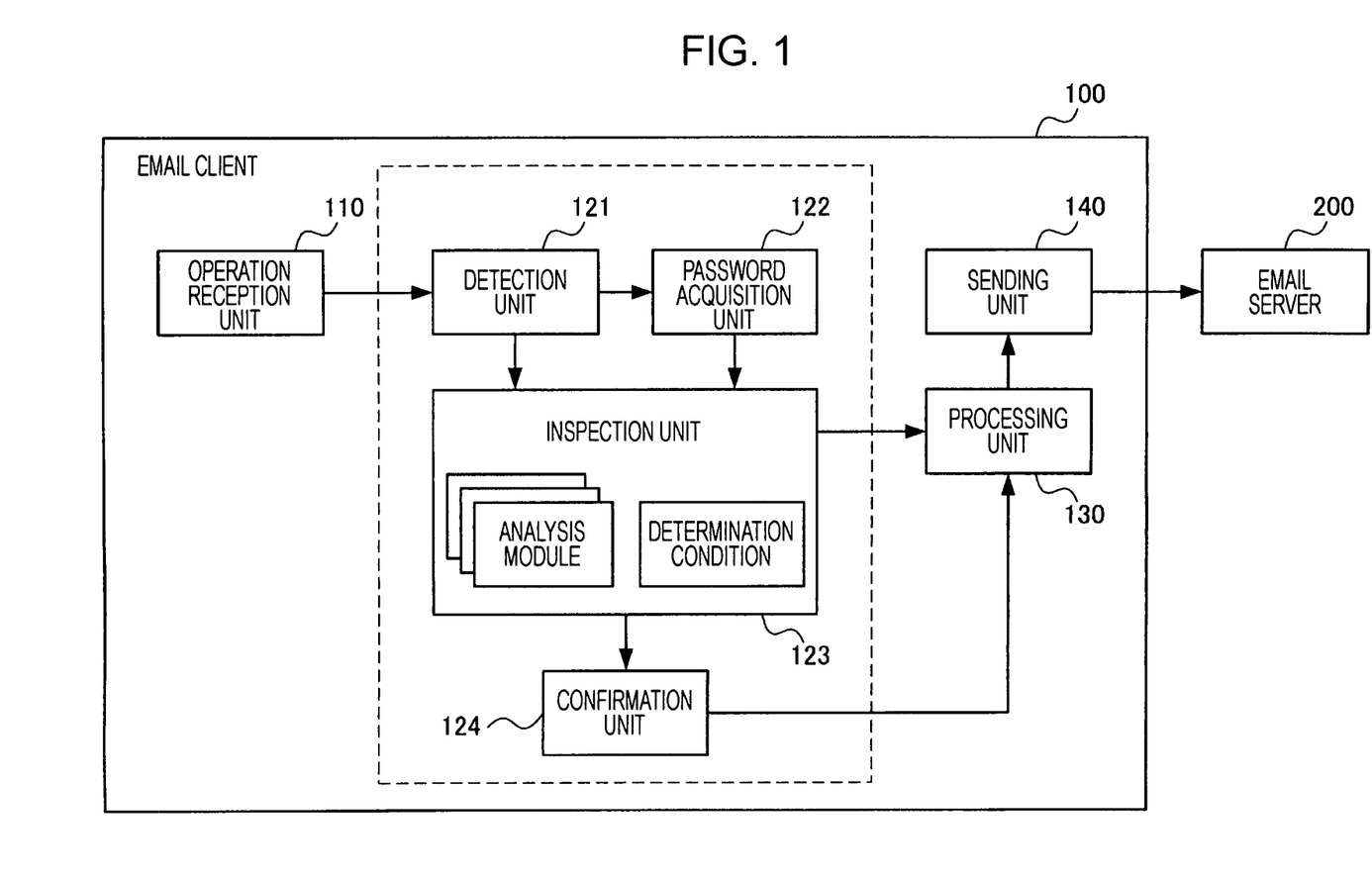
FIG. 1 is a diagram showing a functional configuration of an email client according to an embodiment of the present invention.

FIG. 1 is a diagram showing a functional configuration of an email client according to this embodiment.

An email client 100 is a client terminal that is coupled to an email server 200 and intended to edit and send or receive emails. The email client 100 is realized by a computer such as a personal computer. As shown in FIG. 1, the email client 100 includes an operation reception unit 110, a detection unit 121, a password acquisition unit 122, an inspection unit 123, a confirmation unit 124, a processing unit 130, and a sending unit 140.

Figure 2:
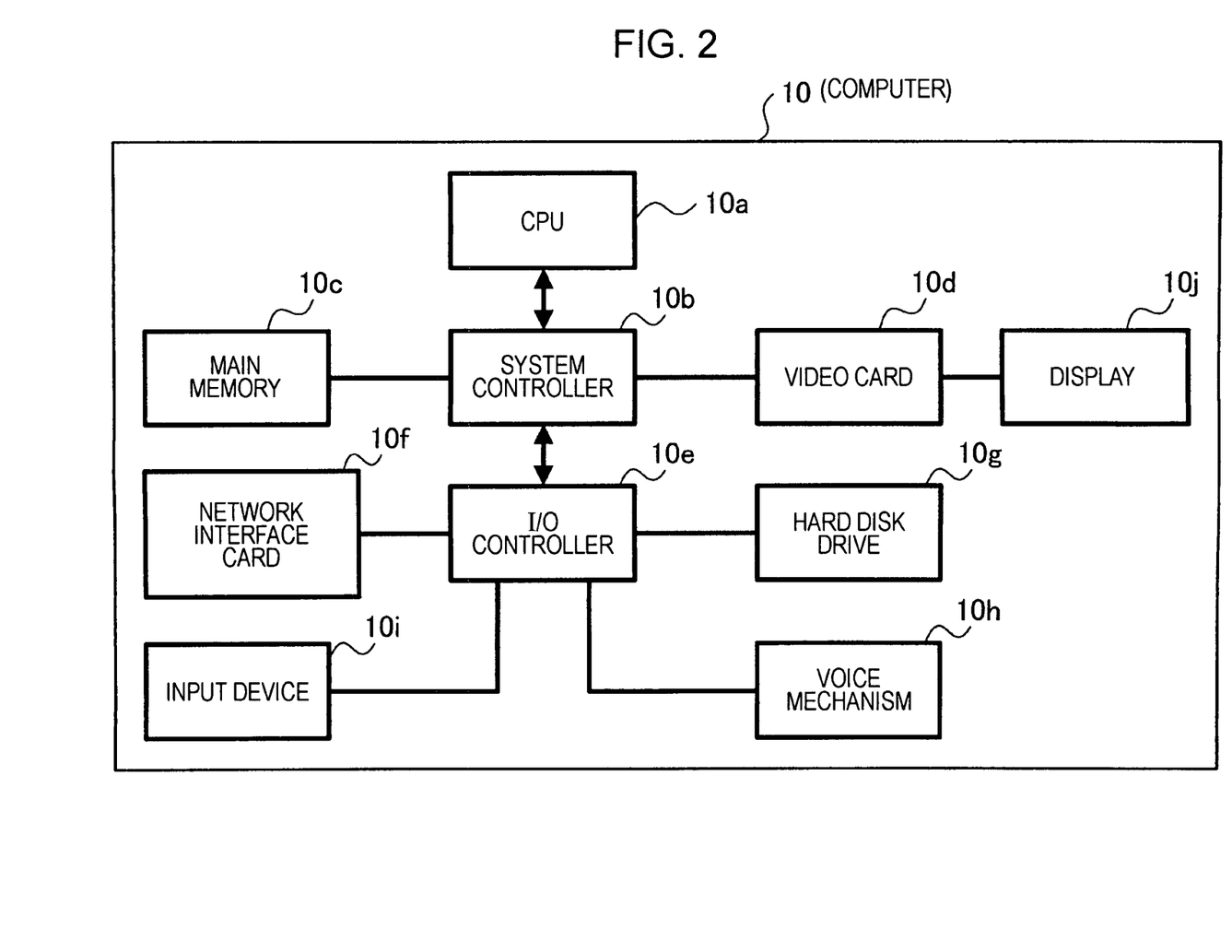
FIG. 2 is a diagram showing a hardware configuration of a computer for realizing the email client according to this embodiment.

FIG. 2 is a diagram showing an example configuration of a computer for realizing the email client 100.

A computer 10 shown in FIG. 2 includes a central processing unit (CPU) 10a as a calculation means, and a main memory 10c and a hard disk drive (HDD) 10g both as a storage means. The computer 10 also includes a network interface card 10f for connecting the computer to an external device via a network, a video card 10d and a display 10j both for producing display output, and a voice mechanism 10h for producing voice output. The computer 10 further includes an input device 10i such as a keyboard or a mouse.

As shown in FIG. 2, the main memory 10c and video card 10d are coupled to the CPU 10a via a system controller 10b. The network interface 10f, hard disk drive 10g, voice mechanism 10h, and input device 10i are coupled to the system controller 10b via an I/O controller 10e. These components are coupled to one another via various types of buses such as a system bus and an input/output bus. For example, the CPU 10a and main memory 10c are coupled to each other via a system bus or a memory bus. The CPU 10a, and the HDD 10g, network interface 10f, video card 10d, voice mechanism 10h, input device 10i, and the like are coupled to each other via an input/output bus such as peripheral components interconnect (PCI), PCI express, serial AT attachment (ATA), universal serial bus (USB), or accelerated graphics port (AGP).

FIG. 2 only illustrates a hardware configuration of a computer suitable for applying this embodiment. Of course, actual email clients are not limited to the illustrated configuration. For example, the computer may include a video memory instead of the video card 10d so that image data is processed by the CPU 10a. Also, instead of providing the voice mechanism 10h as an independent component, a chip set included in the system controller 10b or I/O controller 10e may serve as the voice mechanism 10h. Also, besides the hard disk drive 10g, drives using various types of optical disks or flexible disks as media may be provided as an auxiliary storage unit. While a liquid crystal display is typically used as the display 10j, an arbitrary type of display such as a cathode ray tube (CRT) display or a plasma display may be used instead.

For example, the functions of the email client 100 shown in FIG. 1 are realized when, in the computer shown in FIG. 2, the CPU 10a executes a program read into the main memory 10c. Among the functions shown in FIG. 1, the detection unit 121, password acquisition unit 122, inspection unit 123, and confirmation unit 124 (hereafter, these functions will be collectively referred to as "email filtering functions") perform email filtering. While a program for providing these email filtering functions is included in a program for realizing the email client 100, an add-on module including the program for providing the email filtering functions may be added on to an existing email client.

In FIG. 1, the operation reception unit 110 receives operations for an email edit, file attachment, encryption, transmission, and the like that a user has performed, for example, using the input device 10i shown in FIG. 2. After inspection, which is one of the email filtering functions, is performed, the processing unit 130 performs a process according to the operation received by the operation reception unit 110.

The detection unit 121 detects a specific operation serving as an email filtering start condition, among operations received by the operation reception unit 110. Various types of operations may be set as operations serving as email filtering start conditions. Also, multiple operations may be set depending on the type of filtering. For example, with regard to filtering of an attached file, an operation for attaching a file or an operation for transmission is set as a subject of detection. With regard to filtering of the body of an email, an operation for transmission or an operation for encryption is set as a subject of detection.

If a file attached to an email is filtered and if a password has been set for the file, the password acquisition unit 122 acquires the password. Whether a password has been set for an attached file may be determined using an existing technology such as Application Program Interface (API) included in KeyView Filter (module) provided by the Autonomy Corporation.

Specifically, the password acquisition unit 122 inquires of a user (sender) about the set password, for example, by means such as displaying of a message on the display 10j shown in FIG. 2, so as to urge the user to input the password. If the user inputs the password by operating the operation reception unit 10i, the password acquisition unit 122 acquires the password via the input/output device 110. Also, if a password management file, in which passwords used for attached files are collected, is prepared in a storage means such as the hard disk drive 10g shown in FIG. 2, the password acquisition unit 122 may directly acquire the password by reading the password management file. In this case, the password set for the attached file may be identified by applying the passwords stored in the password management file one after another or by presuming the password on the basis of an attribute of the email, such as the sender, destination, or title.

If the detection unit 121 detects an operation serving as an email filtering start condition, the inspection unit 123 inspects the email. It is assumed in this embodiment that the email itself and attached file are subjects of inspection. If a password has been set for the attached file, the inspection unit 123 authenticates the attached file using the password acquired by the password acquiring unit 122 and then inspects the file.

The inspection unit 123 first analyzes a subject of inspection (email or attached file) using an analysis module. Multiple analysis modules may be prepared according to analysis types and any one or some of the analysis modules may be selectively used according to the subject of inspection. For example, analysis modules for determining the presence or absence of a particular word (personal information, etc.) or the number of appearances of the particular word, whether a particular language or font is used, whether a particular format is used, and the like are prepared separately. These analysis modules are prepared by the manager of the email filtering system or a person in charge of filtering. Also, the system manager or person in charge of filtering makes a setting about which analysis module will be applied to which subject of inspection.

The inspection unit 123 determines whether the email corresponds to an inappropriate item, according to a preset determination condition. As a condition for determining whether the email corresponds to an inappropriate item, various conditions such as a condition about an attribute of the email and a condition about a result of an analysis performed using an analysis module may be set according to the types of filtering. As a condition about an attribute of the email, for example, the maximum number of email addresses settable as destinations (To, Cc, etc.), the presence or absence of an address or a domain, the transmission of an email to which is prohibited, the maximum size of an email, or the like is set. As a condition about an analysis result, for example, the maximum number of pieces of personal information that may be included in an email is set, provided that an analysis module capable of detecting personal information included in text is used. Also, different maximum numbers may be set according to types of personal information. Also, whether to determine that, in a case where an analysis module has failed to properly filter an email to be filtered, the email is an inappropriate email may be set as a condition. The "case where an analysis module has failed to properly filter an email" refers to, for example, a case where the analysis module has sent back an error or a case where it is determined that the description of the email have undergone special encryption and thus has not taken a linguistic form.

Also, a determination condition specific to an attached file as well as the above-described conditions about an analysis result may be set as a determination condition with respect to filtering of an attached file. For example, the format of a file that is allowed to be attached may be set as a determination condition. Or, considering an attached file, for which a password has been set, as an inappropriate item if the sender of the email is inquired of about the password and then cancels the input of the password may be set as a determination condition.

These determination conditions may be set, for example, for each user or for each group of users. Like the analysis modules, these determination conditions are set by the manager of the email filtering system or person in charge of filtering. While a case where the analysis module and determination condition are set separately has been heretofore described, a software module for collectively performing an analysis on a subject of inspection and a determination whether there is an inappropriate item may be prepared and applied.

If the inspection unit 123 determines that the subject of inspection corresponds to an inappropriate item, the confirmation unit 124 inquires of the user about whether a process according to the operation received by the operation reception unit 110 should be performed. Specifically, the confirmation unit 124 provides notification to the user by means such as displaying a confirmation message on the display 10j shown in FIG. 2, and then receives input of an instruction given by the user. In response to the confirmation message, the user may modify the email or attached file or may give an instruction for performance of the process with the email or attached file left intact. If the user gives an instruction for performance of the process with the email or attached file left intact, the confirmation unit 124 may receive input of a comment about the inspection result made by the user.

Figure 3:
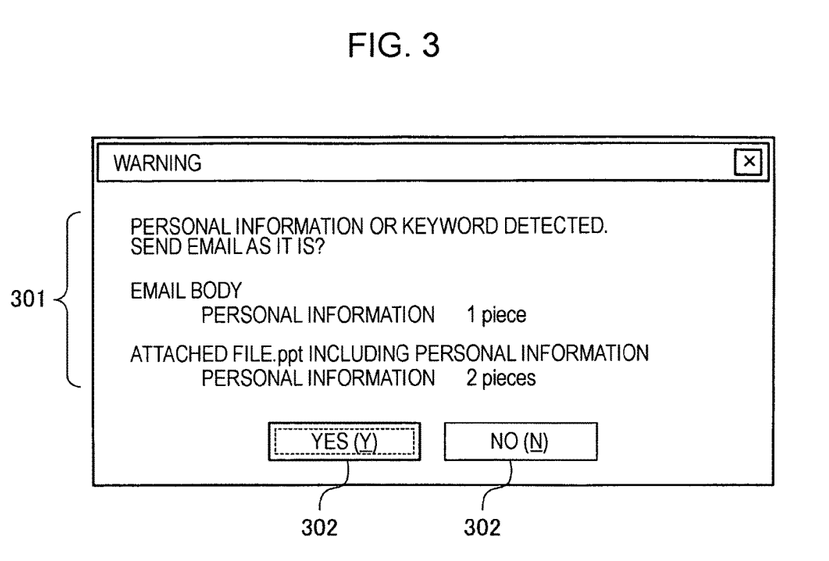
FIG. 3 is a drawing showing an example of a dialog box used when a confirmation unit conveys a confirmation message.

FIG. 3 is a drawing showing an example of a dialog box used when the confirmation unit 124 conveys a confirmation message.

In FIG. 3, the main body of a message indicating the type of the inappropriate item, subjects of inspection in which the inappropriate item has been detected, and the number of appearances of the inappropriate item are shown in a message field 301. The illustrated example shows that by first performing an operation for sending the email and then inspecting the email before performing a sending process, one piece of personal information or keyword, which is an inappropriate item, has been detected in the email body and two pieces of personal information or keyword have been detected in the attached file.

Also, button objects 302 to be used when the user gives an instruction are provided in the dialog box shown in FIG. 3. If the user selects a "YES" button, for example, by clicking the button using a mouse, the transmission of the email, which is a process according to the operation that the user has performed first, is performed. At that time, the confirmation unit 124 may perform an additional process on the email as will be described later. On the other hand, if the user selects a "NO" button, the operation for sending the email that the user has performed first is canceled. In this case, the user may eliminate the personal information or keyword by editing the email or attached file and then perform an operation for sending the email again.

If the process is the transmission of the email and if the user gives an instruction for the performance of the transmission with the email and attached file left intact, the confirmation unit 124 adds another user (person in charge of filtering, superior, etc.), who has the authority to filter the email, as a destination of the email, and attaches a result of the inspection performed by the inspection unit 123 to the email and sends the email. If the user, who is the sender of the email, inputs his or her comment about the inspection result, this comment is also sent to the other user, who has the authority to filter the email, together with the email. Also, if a file, for which a password has been set, is attached to the email, a password acquired by the password acquisition unit 122 is also sent to the other user, who has the authority to filter the email, together with the email.

The processing unit 130 performs a process according to the operation received by the operation reception unit 110. For example, if the operation reception unit 110 has received an operation for attaching a file to an email, the processing unit 130 attaches a specified file to the email, which is the subject of processing. If the operation reception unit 110 has received an operation for sending an email, the processing unit 130 sends the email, which is the subject of processing, via the sending unit 140. If the operation reception unit 110 has received an operation for encrypting and then sending an email, the processing unit 130 encrypts and then sends the email.

If the detection unit 121 detects a specific operation, the processing unit 130 performs a process according to the specific operation after the inspection unit 123 and confirmation unit 124 perform respective processes as described above. For example, if an operation for encryption is set as a specific operation in advance and if an operation for encryption is performed, an email to be encrypted is inspected and the user is inquired about a result of the inspection as necessary, and then the processing unit 130 encrypts the email.

If the operation reception unit 110 has received an operation for sending an email, the sending unit 140 sends the email, which is the subject of processing, to the email server 200 under the control of the processing unit 130.

As is understood from the above-description, if an operation for performing a predetermined process on an email is inputted, the email is inspected before actually undergoing the process. Thus, even if the email client 100 is offline at the time when the operation is inputted, the inspection is performed in real time. Also, the user may immediately modify the email or attached file on the basis of a result of the inspection.

Operations of Email Client 100

Operations of the email client 100 will now be described.

Figure 4:
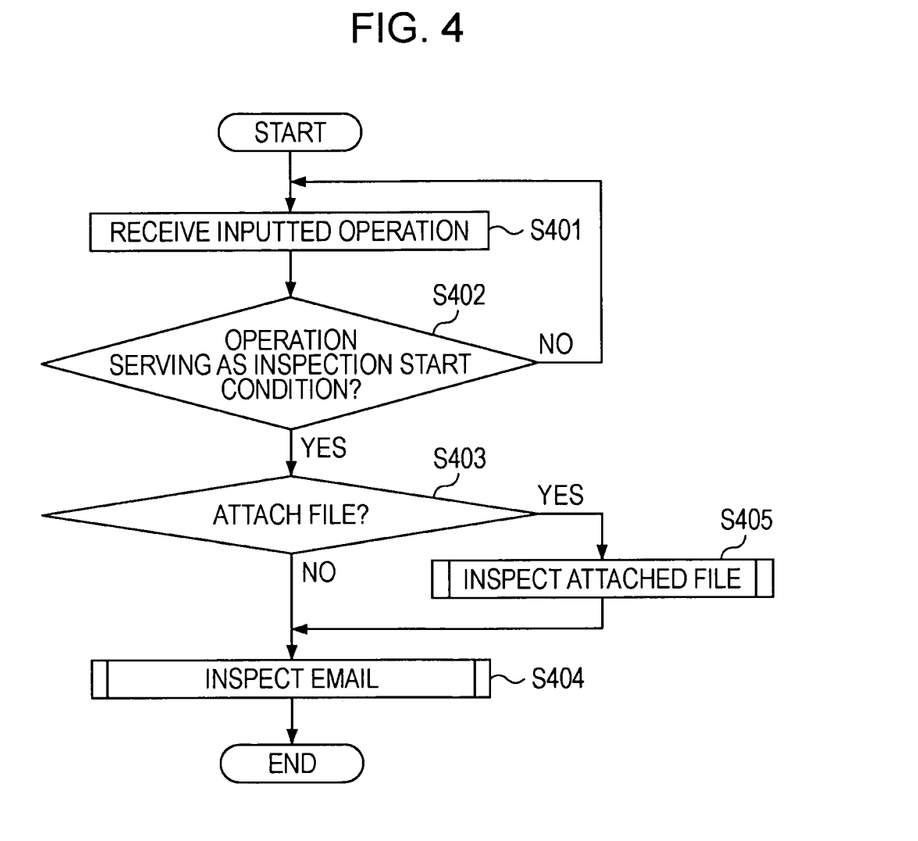
FIG. 4 is a flowchart showing the flow of operations performed by the email client according to this embodiment.
Figure 5:
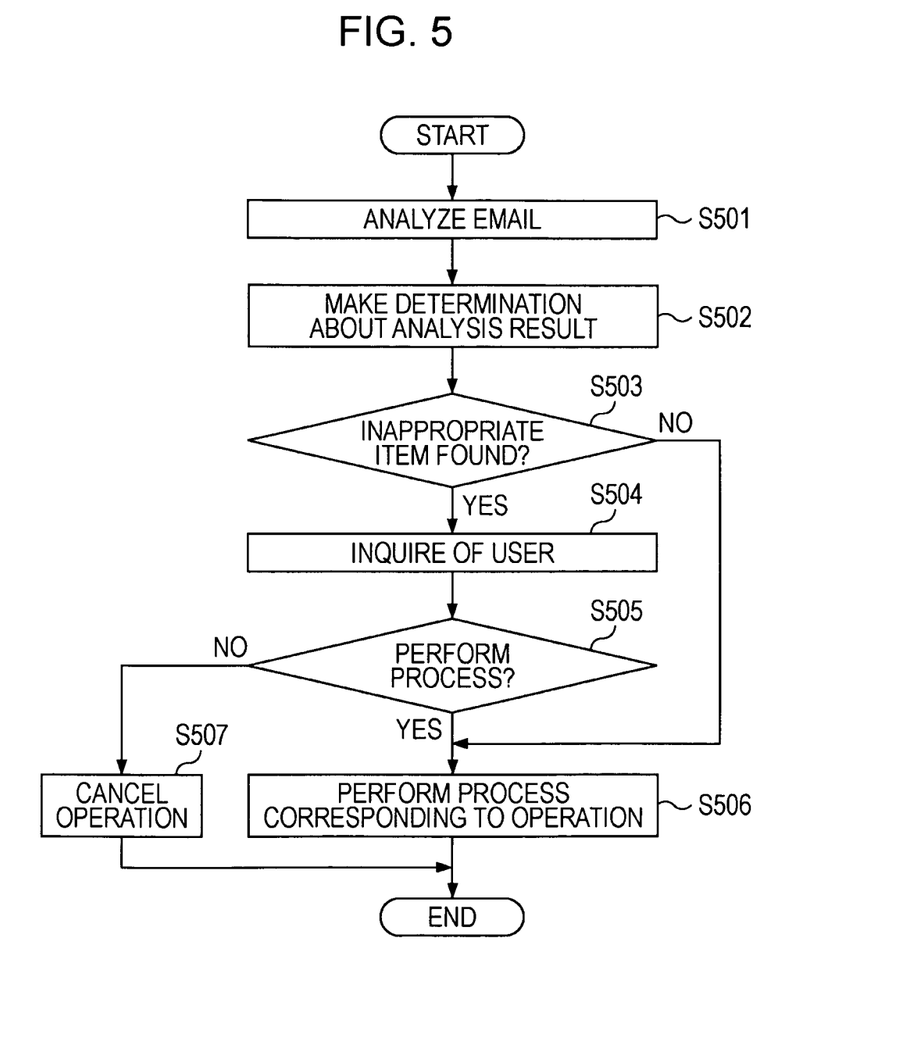
FIG. 5 is a flowchart showing operations performed when an email itself is inspected.
Figure 6:
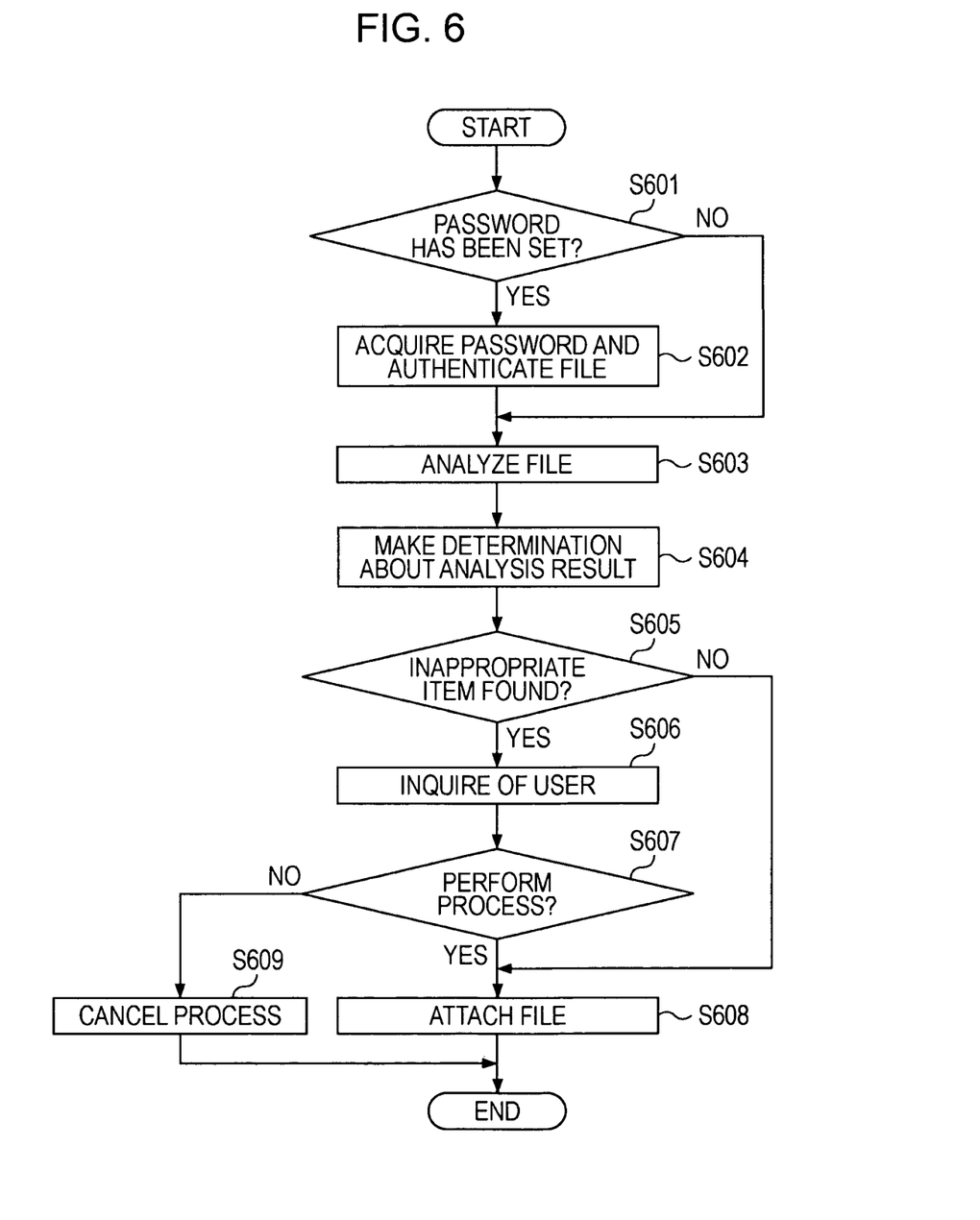
FIG. 6 is a flowchart showing operations performed when an attached file is inspected.

FIGS. 4 to 6 are flowcharts showing the flow of operations of the email client 100.

Hereafter, operations (FIG. 5) performed when an email itself is inspected and operations (FIG. 6) performed when an attached file is inspected will be described separately.

As shown in FIG. 4, in the email client 100, the operation reception unit 110 first receives an inputted operation (step 401). Then, the detection unit 121 determines whether a specific operation, which is an inspection start condition, has been received (step 402). If the operation received by the operation reception unit 110 is not a specific operation (NO in step 402), the flowchart returns to step 401 and the operation reception unit 110 waits for a subsequent operation to be inputted.

If the operation received by the operation reception unit 110 is a specific operation (YES in step 402), the detection unit 121 determines whether the specific operation is an operation for attaching a file to an email (step 403). If the specific operation is not such an operation (No in step 403), the inspection unit 123 inspects the email (step 404). On the other hand, if the specific operation is such an operation (YES in step 403), the inspection unit 123 inspects the attached file (step 405) and then inspects the email (step 404).

Referring to FIG. 5, the inspection of an email will be described.

The inspection unit 123 analyzes the email, which is the subject of analysis, using a prepared analysis module (step 501). Then, the inspection unit 123 makes a determination about the analysis result according to a predetermined determination condition (step 502). If it is determined that the email corresponds to no inappropriate items (NO in step 503), the processing unit 130 performs a process (encryption, transmission, etc. of an email) corresponding to the operation received by the operation reception unit 110 on the email, which is the subject of processing (step 506).

If it is determined that the email corresponds to an inappropriate item (YES in step 503), the confirmation unit 124 conveys, to the user, a confirmation message for inquiring about whether a process should be performed on the email (step 504). For example, if the user selects "YES" in the dialog box shown in FIG. 3 to give an instruction for the performance of the process (YES in step 505), the processing unit 130 performs the process corresponding to the operation received in step 401 of FIG. 4 (step 506).

On the other hand, if the user selects "NO" in the dialog box shown in FIG. 3 to give an instruction for the cancellation of the process (NO in step 505), the operation received in step 401 of FIG. 4 is cancelled (step 507).

Referring now to FIG. 6, the inspection of an attached file will be described.

First, the password acquisition unit 122 checks whether a password has been set for the attached file (step 601). If a password has been set, the password acquisition unit 122 acquires the password by inquiring of the user about the password or by accessing the password management file (step 602). Later operations are almost the same as those performed when the email is inspected, which are shown in FIG. 5.

The inspection unit 123 analyzes the file, which is the subject of analysis, using a prepared analysis module (step 603). Then, the inspection unit 123 makes a determination about a result of the analysis according to a predetermined determination condition (step 604). If it is determined that the file corresponds to no inappropriate items (NO in step 605), the processing unit 130 attaches the file, which is the subject of processing, to an email (step 608).

On the other hand, if it is determined that the file corresponds to an inappropriate item (YES in step 605), the confirmation unit 124 conveys, to the user, a confirmation message for inquiring about whether the attachment of the file should be performed (step 606). For example, if the user selects "YES" in the dialog box shown in FIG. 3 to give an instruction for the performance of the file attachment (YES in step 607), the processing unit 130 attaches the file to the email (step 608).

On the other hand, if the user selects "NO" in the dialog box shown in FIG. 3 to give an instruction for the cancellation of the file attachment (NO in step 607), an operation for attaching a file to an email that has been received in step 401 of FIG. 4 is cancelled (step 609).

While the embodiment of the present invention has been heretofore described, the technical scope of the invention is not limited to the embodiment. For example, in the above-described embodiment, the attached file is inspected when an operation for attaching a file to an email is inputted; however, the inspection may be performed at an arbitrary timing before the email is sent. Also, it will be apparent from the description of the appended claims that what are obtained by making various changes or modifications to the above-described embodiment fall within the technical scope of the present invention.

REFERENCE NUMERALS 100 email client
110 operation reception unit
121 detection unit
122 password acquisition unit
123 inspection unit
124 confirmation unit
130 processing unit
140 sending unit

The invention claimed is:

1. An email filtering system comprising:
an operation reception unit executing in a computer with a processor and memory for receiving an operation performed by an email composing user with respect to an e-mail composed by the email composing user;
a processing unit executing in the computer for performing, on the email, a process according to the operation received by the operation reception unit;
a detection unit executing in the computer for detecting that the operation reception unit has received a specific operation;
an inspection unit executing in the computer for, if the detection unit detects the specific operation, inspecting the email and a file to be attached to the email before the processing unit performs a process;
a confirmation unit executing in the computer for conveying, to the email composing user, a message for inquiring about whether the process according to the operation received by the operation reception unit should be performed, on the basis of a result of the inspection performed by the inspection unit, wherein if the confirmation unit has not conveyed the message or if an instruction for performance of the process is inputted, the processing unit performs the process, and wherein if the instruction for performance of the process is inputted, the processing unit sets, for a destination of the email, an address of a different user who is a person having the authority to approve transmission of the email.

2. The system according to claim 1, wherein
if the detection unit detects an operation for attaching the file to the email, the inspection unit inspects the email and the file.

3. The system according to claim 1, further comprising
a password acquisition unit executing in the computer for checking whether a password has been set for the file to be attached to the email and, if a password has been set, acquiring the set password, wherein
the inspection unit authenticates the file using the password acquired by the password acquisition unit so as to inspect the file.

4. The system according to claim 3, wherein
the password acquisition unit conveys, to a user, a message urging the user to input the set password and receives the set password inputted by the user, so as to acquire the set password.

5. The system according to claim 3, wherein
the password acquisition unit acquires the set password by reading the set password from a password management file in which passwords that may be used are collected.

6. An email filtering method using an email filtering system executing in a computer with a processor and memory, the method comprising the steps of:
receiving in the email filtering system executing in the computer, an operation performed by a composing user with respect to an email composed by the composing user and detecting that a specific operation has been received;
if the specific operation is detected, inspecting the email and a file to be attached to the email; and
inquiring about whether a process according to the specific operation should be performed, on the basis of a result of the inspection; and,
if an instruction for performance of the process is inputted, performing the process and setting, for a destination of the email, an address of a different user who is a person having the authority to approve transmission of the email that had been composed by the composing user.

7. The method according to claim 6, wherein
if an operation for attaching a file to the email is detected, inspecting the email and the file.

8. The method according to claim 6, further comprising the step of
checking whether a password has been set for a file to be attached to the email and, if a password has been set, acquiring the set password, wherein
in the step of inspecting the email and the file, the file is authenticated using the acquired password so as to inspect the file.

9. The method according to claim 6, further comprising the step of
conveying, to a user, a message for inquiring about whether the process according to the operation should be performed, on the basis of a result of the inspection, wherein
in the step of performing the process, if the message has not been conveyed or if an instruction for performance of the process is inputted, the processing unit performs the process.

10. A computer program product comprising a non-transitory computer usable medium embodying computer usable program code for email filtering, the computer program product comprising:
computer usable program code for receiving an operation performed by a composing user with respect to an email composed by the composing user;
computer usable program code for performing, on the email, a process according to the operation received by the operation reception means;
computer usable program code for detecting that the operation reception means has received a specific operation; and
computer usable program code for inquiring about whether a process according to the specific operation should be performed, on the basis of a result of the inspection; and, if an instruction for performance of the process is inputted, performing the process and setting, for a destination of the email, an address of a different user who is a person having the authority to approve transmission of the email that had been composed by the composing user.

11. The program product according to claim 10, wherein
if an operation for attaching the file to the email is detected, the email and file inspecting means inspects the email and the file.

12. The program product according to claim 10,
the program product causing the computer to further function as computer usable program code for checking whether a password has been set for the file to be attached to the email and, if a password has been set, acquiring the set password, wherein the email and file inspecting means authenticates the file using the acquired password so as to inspect the file.

13. The program product according to claim 10, the program product causing the computer to further function as computer usable program code for conveying, to a user, a message for inquiring about whether the process according to the operation should be performed, on the basis of a result of the inspection, wherein if the message has not been conveyed or if an instruction for performance of the process is inputted, the process performing means performs the process.

\* \* \* \* \*